United States Patent [19]
Beller et al.

[11] Patent Number: 5,802,449
[45] Date of Patent: Sep. 1, 1998

[54] BROADBAND COMMUNICATION SYSTEM AND METHOD THEREFOR

[75] Inventors: Dieter Beller, Korntal; Gert Grammel, Uhingen; Gerhard Elze, Autong, all of Germany

[73] Assignee: Alcatel N.V., Rijswijk, Netherlands

[21] Appl. No.: 612,419

[22] Filed: Mar. 7, 1996

[30] Foreign Application Priority Data

Mar. 9, 1995 [DE] Germany ............ 195 08 394.6

[51] Int. Cl.$^6$ .................................. H04N 7/173
[52] U.S. Cl. .............. 455/5.1; 455/4.2; 348/12; 348/7
[58] Field of Search ............. 455/4.2, 5.1, 6.2, 455/6.3, 6.1; 348/7, 12, 13, 10, 11, 14, 15, 16, 17, 18, 19, 20; H04N 7/16, 7/173

[56] References Cited

U.S. PATENT DOCUMENTS

| | | | |
|---|---|---|---|
| 5,572,517 | 11/1996 | Safadi ............ | 348/10 |
| 5,594,726 | 1/1997 | Thompson et al. ... | 348/12 |
| 5,606,725 | 2/1997 | Hart ............ | 348/12 |
| 5,640,196 | 6/1997 | Behrens et al. ...... | 348/12 |

FOREIGN PATENT DOCUMENTS

| | | |
|---|---|---|
| 0183871 | 6/1986 | European Pat. Off. . |
| 0234280 | 9/1987 | European Pat. Off. . |
| 0318335 | 5/1989 | European Pat. Off. . |
| 0378087 | 7/1990 | European Pat. Off. . |
| 0639030 | 2/1995 | European Pat. Off. . |
| 3129752 | 2/1983 | Germany . |
| 4242800 | 7/1983 | Germany . |
| 2917978 | 12/1983 | Germany . |
| 3439399 | 4/1986 | Germany . |
| 4221474 | 10/1992 | Germany . |
| 4227118 | 11/1993 | Germany . |

OTHER PUBLICATIONS

Brochure—Aug. 1994, "The Telecommunications Engineer", pp. 5 -10, Heidecker Publishers.

"ATM—The Boradband–ISDN Technique" bu G. Siegmund, Decker Publishers 1993, pp. 73–77.

"Textbook of Television Technology" by K. Bergmann, vol. 1, 1986 Trade Publishers Schiele & Schon, GMbH, pp. 377–379.

"ElectricaL Information Ways", 3rd quarter 1993, pp. 248 –259.

*Primary Examiner*—Chris Grant
*Attorney, Agent, or Firm*—Ware, Fressola, Van der Sluys & Adolphson LLP

[57] ABSTRACT

A broadband communication system (SYS), which is used to distribute television, radio and video signals, is additionally used for transmitting data signals from one subscriber (TN) to another subscriber (TN). The center (ZE) of the broadband communication system (SYS) has a service-on-demand server (SOD) which contains a control facility (CONTROL). The control facility (CONTROL) receives information transmitted by a subscriber (TN) via the return channel (R) to the center, performs a frequency conversion and transmits the information via the downstream channel (V) to all the subscribers (TN) of the broadband communication system (SYS). The information contains a source address, a destination address and the subscriber-specific data to be transmitted. Only subscribers (TN) whose address coincides with the destination address are able to interpret the information through a modem MODEM.

10 Claims, 5 Drawing Sheets

BROADBAND COMMUNICATION SYSTEM AND METHOD THEREFOR

TECHNICAL FIELD

The invention concerns a broadband communication system for two-way transmission of information between a center and a plurality of subscribers; a method therefor; and a center for the broadband communication system. The broadband communication system is structured as a broadband distribution network.

BACKGROUND OF THE INVENTION

Broadband communication systems as such are known e.g. from the August 1994 brochure "The Telecommunications Engineer", pages 5–10, Heidecker Publishers. A broadband distribution network is described which, in addition to different types of unidirectional TV services, also makes available bidirectional, interactive video services. The subscribers receive television and video signals via a downstream channel, and can request their individual subscriber video signal from the server via a return channel. In this way, the broadband distribution network serves to distribute video signals on the one hand, and to communicate between subscriber and server on the other. A disadvantage of the broadband distribution network is that the communication between subscriber and server is limited to the subscribers accepting or refusing offers made by the server.

The book "ATM—The Broadband-ISDN Technique" by G. Siegmund, Decker Publishers 1993, describes on pages 73–77 a network access to a broadband service-integrating digital network, the so-called B-ISDN. Subscriber terminals, particularly computers, are connected to the broadband network via a bus structure. Transmission channels are assigned to the subscribers for transmitting information. Exchanges are needed so that subscribers can communicate with each other.

SUMMARY OF THE INVENTION

It is therefore the task of the invention to make available a broadband communication system that offers more flexible applications to the subscribers.

A particular advantage of the invention is the possibility of computer networking via a broadband communication system. Another advantage is the flexibility of adding further subscriber terminals by using a collision monitoring method.

One aspect of the invention is a broadband communication system for two-way transmission of information between a center and a plurality of subscribers, wherein groups of subscribers are connected to one broadband network termination each, the broadband network terminations being connected to the center, wherein information is transmittable from the center to the subscribers in a broadband downstream channel, and from the subscribers to the center in a narrow-band return channel, and wherein the information transmitted from one of the subscribers in the return channel is assignable to the plurality of subscribers via a channel in the downstream channel by means of a control facility located at the center, characterized in that each of the broadband network terminations comprises a control unit, and that each of the control units can detect any simultaneous transmission of information from different subscribers of a group, and prevent said information from being forwarded to the center.

BRIEF DESCRIPTION OF THE DRAWINGS

The invention is explained in the following by means of two configuration examples with the aid of FIGS. 1 to 6, wherein.

BEST MODE FOR CARRYING OUT THE INVENTION

A first configuration example of the invention will now be described by means of FIGS. 1 to 4.

Figure 1:
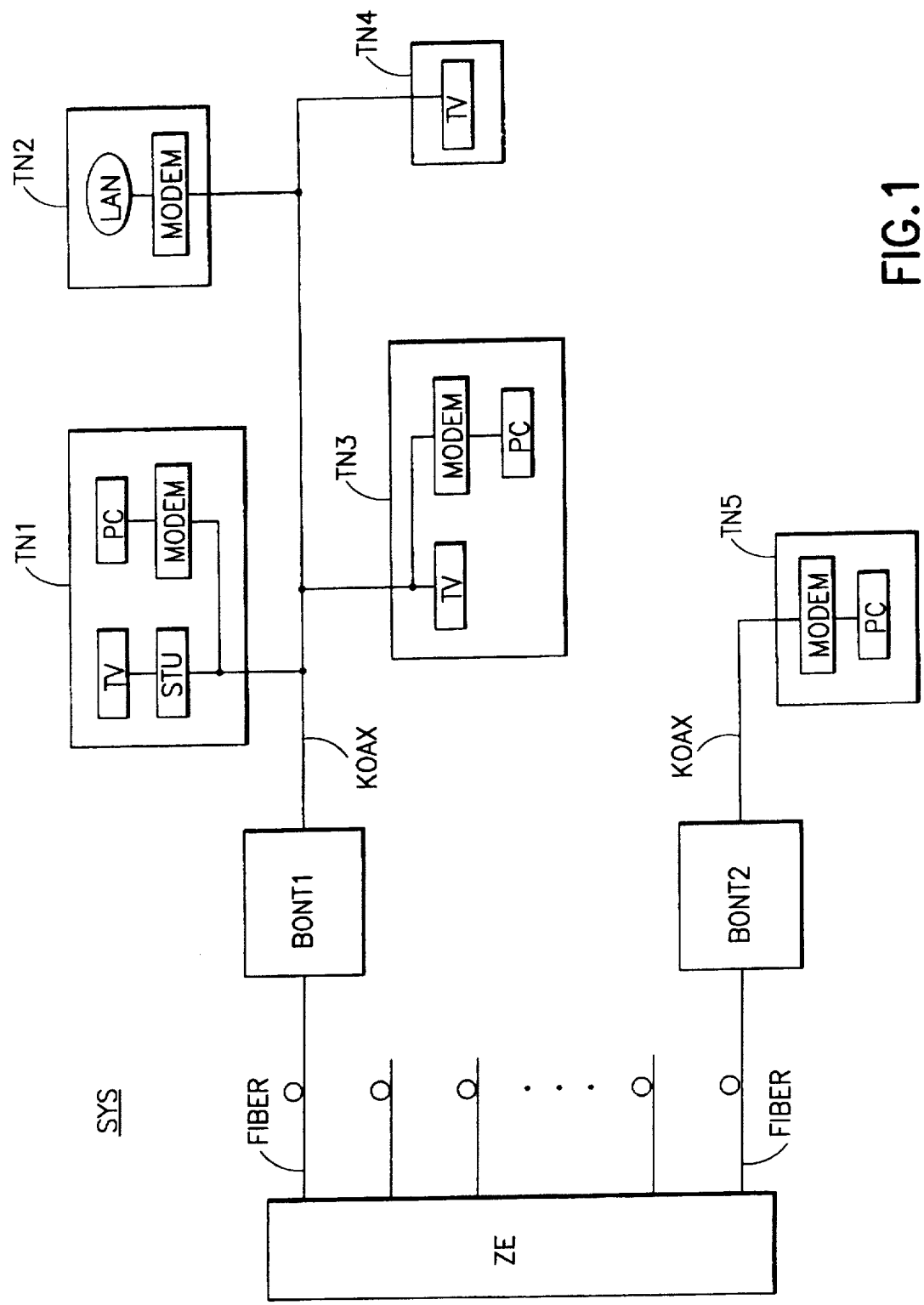
FIG. 1 is a schematic illustration of a first configuration example of the invention's broadband communication system connected to five subscribers.

FIG. 1 illustrates a broadband communication system SYS connected to five subscribers. The broadband communication system SYS comprises a center ZE and two broadband network terminations BONT1, BONT2. Each one of the broadband network terminations BONT1, BONT2 is connected with the center ZE through an optical glass fiber line FIBER. The center ZE has more than two optical glass fiber connections for connecting further broadband network terminations BONT. The first broadband network termination BONT1 is connected to four subscribers TN1, TN2, TN3, TN4 via an electric coaxial line KOAX. The second broadband network termination BONT2 is connected to a fifth subscriber TN5 via an electric coaxial line KOAX.

The first subscriber TN1 has a television receiver TV, a set-top converter STU, a modem MODEM and a subscriber terminal PC. The set-top converter STU connects the television receiver TV with the electric coaxial line KOAX. The subscriber terminal PC, which is e.g. a data terminal PC or a computer PC, is connected to the electric coaxial line KOAX via a modem MODEM.

The second subscriber TN2 has a modem MODEM and a local network LAN. The local network LAN, a so-called local area network LAN, is connected to the electric coaxial line via the modem MODEM.

The third subscriber TN3 has a television receiver TV, a modem MODEM and a subscriber terminal PC. The television receiver TV is directly connected to the electric coaxial line KOAX; the subscriber terminal PC, e.g. a computer PC, is connected to the electric coaxial line via the modem MODEM.

The fourth subscriber TN4 has a television receiver TV, which is directly connected to the electric coaxial line KOAX.

The fifth subscriber TN5 has a modem MODEM and a subscriber terminal PC. The subscriber terminal PC, e.g. a data terminal PC, is connected to the second broadband network termination BONT2 via the modem MODEM and the electric coaxial line KOAX.

The center ZE is used to distribute television signals, video signals, radio signals and data signals. Signals transmitted by the center ZE are sent to the broadband network terminations BONT1, BONT2 via optical glass fiber lines FIBER. An electrical conversion takes place in the broadband network terminations BONT1, BONT2. The signals being transmitted by the broadband network terminations BONT1, BONT2 are sent via an electric coaxial line KOAX to one TN5 or several subscribers TN1, TN2, TN3, TN4. The transmission of signals from the center ZE to the subscribers TN1 to TN5 takes place in a downstream channel with a high data rate, in a frequency range of about 50 MHz to 862 MHz. The transmission of signals from subscribers TN1 to TN5 to the center ZE takes place in a return channel with a low data rate, in a frequency range of about 5 MHz to 45 MHz. Each subscriber TN1 to TN5 can basically receive all the signals transmitted by the center ZE. However, many signals are encoded and can only be decoded by authorized subscribers. Subscribers TN1, TN3, TN4 are able to display television and radio signals on their television receiver TV.

Specially encoded television and video signals can only be decoded by subscribers TN1 with set-top converters STU and displayed on the television receiver TV. Special video films, which are offered by the center ZE in a video film catalog, can be requested by subscriber TN1 through the set-top converter STU. The center ZE sends the requested video film in the form of video signals to all subscribers TN1 to TN5, for the exclusive authorized decoding by subscriber TN1. Only subscriber TN1 is authorized and in a position to decode the requested video signals via the set-top converter STU.

Subscribers TN1, TN2, TN3, TN5 have the ability to send and receive information in the form of data signals via the respective modem MODEM. The data signals can e.g. comprise the data of a computer PC or a local network LAN. The respective modem MODEM adds a source address and a destination address to the data being transmitted. The source address is the address of the subscriber TN1, who is transmitting the data. The destination address is the address of the subscriber TN to whom the data are being transmitted. A data signal therefore contains a source address, a destination address and subscriber-specific data. The modem MODEM of a subscriber TN can only process data signals in which the destination address coincides with the address of the subscriber TN. This ensures that data intended for a subscriber TN cannot be received by another subscriber as well.

To send information in the form of data signals from one subscriber TN to another, e.g. from subscriber TN5 to subscriber TN1, the address of subscriber TN5 is first added as the source address, and the address of subscriber TN1 is added as the destination address. The resulting data signal is modulated by the modem MODEM of subscriber TN5 so that it can be transmitted in the frequency band of the return channel in the broadband communication system SYS. The data signal is then transmitted to the center ZE via the return channel and via the broadband network termination BONT2. The center ZE receives the data signal and, by performing a frequency conversion, processes it so that it can be transmitted in the frequency band of the downstream channel in the broadband communication system SYS. Because of the tree structure of the broadband communication system SYS, the data signal is then transmitted to all subscribers TN1 to TN5. Subscribers TN1 recognizes the destination address in the data signal as his own, and demodulates the data signal with the modem MODEM. In this way the data from subscriber TN5 are transmitted with his address to subscriber TN1. Subscriber TN1 can then transmit a return message to subscriber TN5, acknowledging the receipt of the data from subscriber TN5. In addition to the source address, this return message contains e.g. an indication of the extent of the received data.

Figure 2:
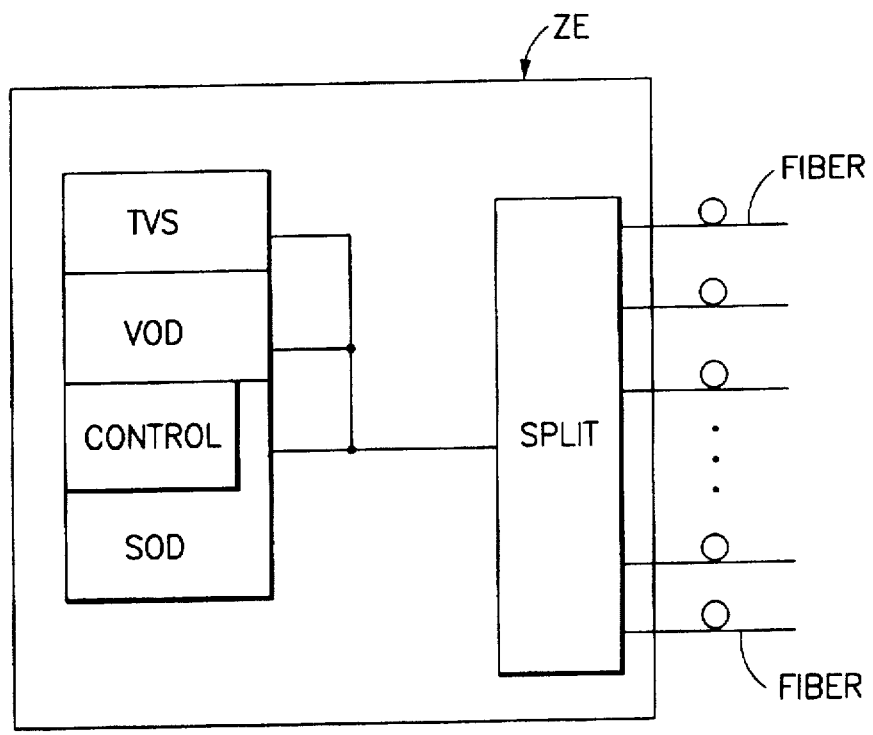
FIG. 2 is a schematically illustrated construction of a center of the invention's broadband communication system in FIG. 1.

FIG. 2 is a schematic illustration of the center in FIG. 1. The center ZE comprises a television and radio server TVS, a video-on-demand server VOD, a service-on-demand server SOD with a control facility CONTROL, and an optical beam splitter SPLIT. The television and radio server TVS and the video-on-demand server VOD are used to distribute radio, television and video signals. The individual signals are superimposed and routed to an optical beam splitter SPLIT, which transmits them to the broadband network terminations BONT and to the subscribers TN.

The service-on-demand server SOD is used as a relay station for transmitting data signals from one subscriber to another subscriber. The service-on-demand server SOD receives the data signals from the one subscriber in the return channel of the broadband communication system SYS, processes the data signals in the control facility CONTROL, and by means of the tree structure of the broadband communication system SYS, transmits the data signals via the downstream channel of the broadband communication system SYS to all subscribers connected to the center, thereby also reaching the other subscriber and ensuring the transmission of the data signals. To that end, a frequency conversion takes place in the control facility, whereby the data signals are converted from the frequency range of the return channel to the frequency range of the downstream channel.

Figure 3:
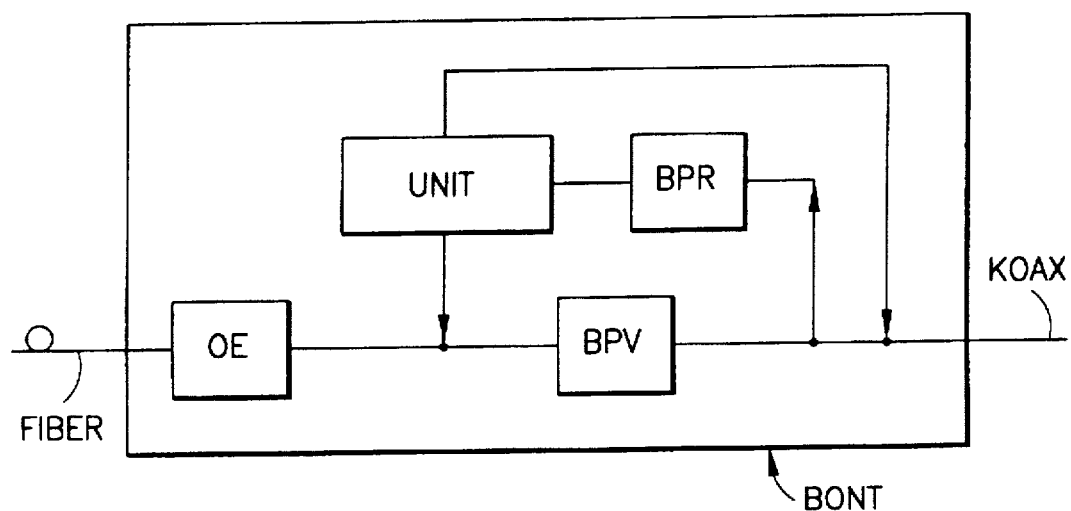
FIG. 3 is a schematically illustrated construction of a broadband network termination of the invention's broadband communication system in FIG. 1.

FIG. 3 is a schematic illustration of one of the two equivalent broadband network terminations in FIG. 1. The broadband network termination BONT comprises an optical-electrical converter OE, a control unit UNIT, a band-pass filter for the return channel BPR and a band-pass filter for the downstream channel BPV. The band-pass filters BPR, BPV are e.g. passive electrical filters.

The signals transmitted to the broadband network termination BONT by the center ZE are optically-electrically converted by the optical-electrical converter OE and transmitted via the band-pass filter for the downstream channel BPV to the subscribers TN, who are connected to the broadband network termination BONT. The band-pass filter for the downstream channel BPV only lets signals pass, whose frequency is in the frequency range of the downstream channel; the band-pass filter for the downstream channel BPV especially blocks signals whose frequency is in the frequency range of the return channel.

The signals transmitted by the subscribers TN to the broadband network termination via the return channel are filtered by the band-pass filter for the return channel BPR and routed to the control unit UNIT. The band-pass filter for the return channel BPR only lets signals pass, whose frequency is in the frequency range of the return channel. Collision monitoring takes place in the control unit UNIT. Since several subscribers are connected to a broadband network termination BONT via a common line KOAX, and all subscribers TN have equal access to the common line KOAX, collisions can occur during the simultaneous transmission of information from different subscribers TN through the common line. The detection of collisions takes place e.g. with a threshold value detector, which sends out an alarm if the amplitude of the monitored signal exceeds a predetermined threshold value. If a collision occurs, the transmission of the collision to the center is blocked, and all subscribers TN connected to the respective broadband network termination BONT receive a return message from the control unit UNIT about the occurrence of a collision, via the downstream channel.

The subscribers TN repeat their transmission after a period of time determined by a random generator. The random generator is located in the modem MODEM. If a collision occurs, the signals from the subscribers TN are forwarded by the control unit UNIT to the center ZE.

Figure 4:
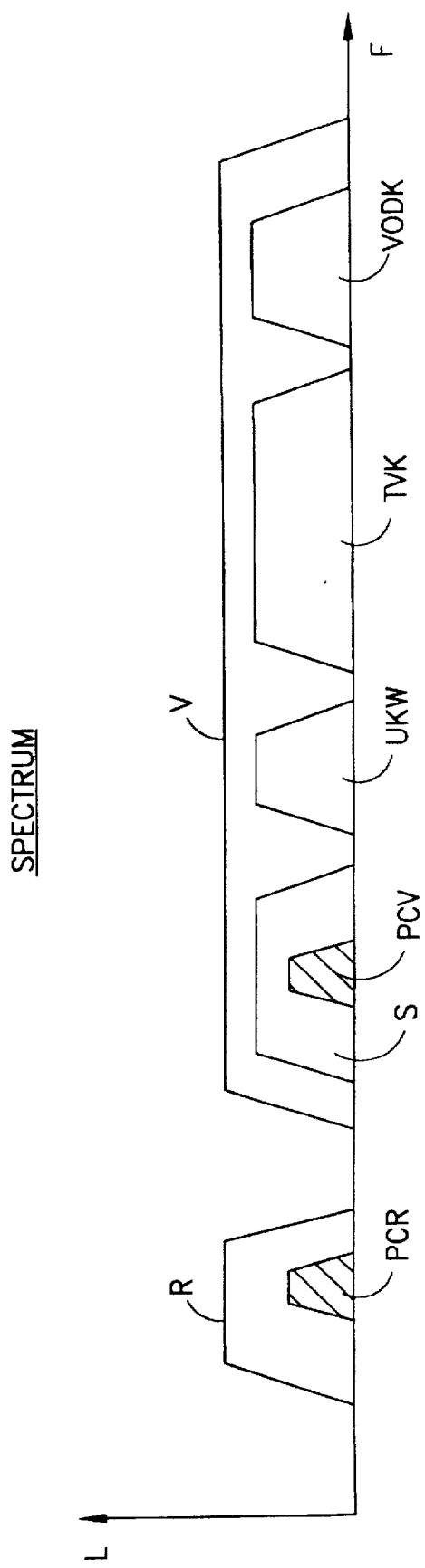
FIG. 4 is a power density spectrum.
Figure 5:
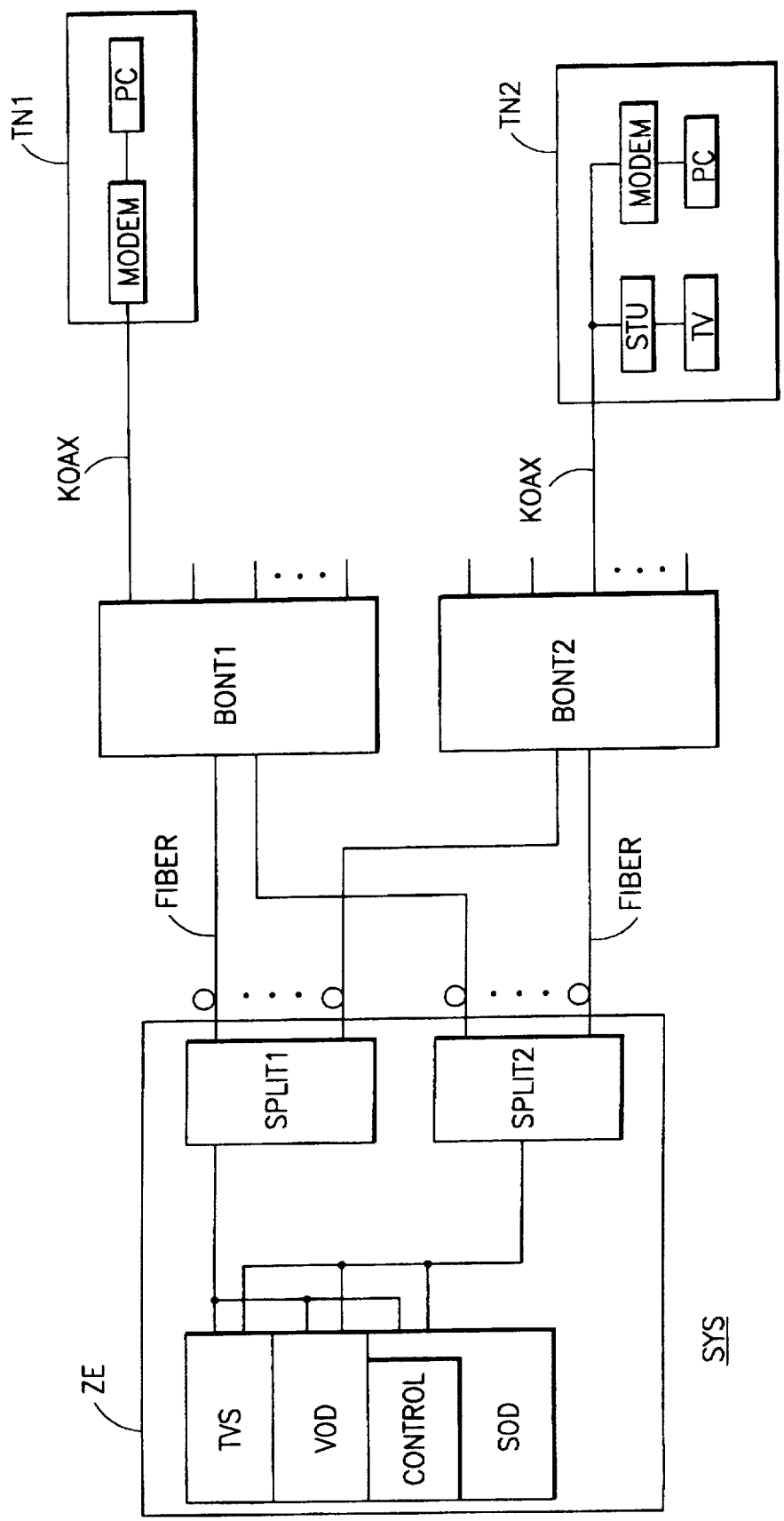
FIG. 5 is a schematic illustration of a second configuration example of the invention's broadband communication system connected to two subscribers.

FIG. 4 illustrates a power density spectrum for the signals transmitted by the broadband communication system SYS in FIGS. 1 and 5.

In the power density spectrum SPECTRUM, the power density L of the signals is displayed vertically and the frequency F horizontally. The return channel R is located in a low frequency range of about 5 MHz to 45 MHz. In the return channel R, a 10 MHz wide channel e.g., the data channel in the return channel PCR, is reserved for the transmission of data signals from the subscribers TN to the center ZE. The downstream channel V is located in a higher frequency range of about 50 MHz to 862 MHz. The downstream channel V comprises a control channel S, a radio channel UKW, a television channel TVK and a video-on-demand channel VODK. Information for the set-top converter STU is transmitted via the control channel S, e.g. to disconnect requested video signals. In the control channel S, a 10 MHz wide data channel in the downstream channel PCV is reserved e.g. for transmitting data signals from the center ZE to the subscribers TN.

A second configuration example of the invention will now be described by means of FIGS. 5 and 6.

FIG. 5 illustrates a broadband communication system connected to two subscribers. The broadband communication system SYS has a center ZE and two broadband network terminations BONT1, BONT2. The center ZE has a television and radio server TVS for transmitting television and radio signals, a video-on-demand server VOD for transmitting video signals, a service-on-demand server SOD with a control facility CONTROL for transmitting, processing and receiving data signals, and two optical beam splitters SPLIT1, SPLIT2. The television, radio and video signals are transmitted to the broadband network terminations BONT1, BONT2 via the optical beam splitter SPLIT1, and via optical glass fiber lines FIBER. The data signals are transmitted to and from the center ZE, and from and to the broadband network terminations BONT1, BONT2, via the second optical beam splitter SPLIT2. The control and the return channels of the broadband communication system SYS are transmitted via the second optical beam splitter SPLIT2.

A first subscriber TN1 is connected to the first broadband network termination BONT1 by a separate electric coaxial line KOAX. The subscriber TN1 has a modem MODEM and a subscriber terminal PC, preferably a data terminal PC, such as a computer PC. The second broadband network termination BONT2 connects a second subscriber TN2 through a separate electric coaxial line KOAX. The subscriber TN2 has a set-top converter STU, a television receiver TV, a modem MODEM and a subscriber terminal PC, e.g. a computer PC. The subscriber TN2 can receive television, radio and video signals through the set-top converter, then display them on the television receiver, and also request additional special television and video signals from the television and radio server TVS, or from the video-on-demand server VOD, via the return channel of the broadband communication system SYS. The subscriber TN2 can receive and transmit data signals via the modem MODEM. To transmit data signals from subscriber TN2 to the subscriber TN1, the data signals are first transmitted to the service-on-demand server SOD in the return channel via the broadband network termination BONT2 and the optical beam splitter SPLIT2. By means of a frequency conversion, the control facility CONTROL in the service-on-demand server SOD converts the data signals from the frequency range of the return channel to the frequency range of the control channel. One possibility of performing the frequency conversion is known from the "Textbook of Television Technology", by K. Bergmann, Volume 1, 1986, Trade Publishers Schiele & Schon GmbH, pages 377–379. The data signals are then transmitted to subscriber TN1 by the control channel via the optical beam splitter SPLIT2 and the broadband network termination BONT2. The data signals contain a source address, a destination address and the data to be transmitted. The source address is the address of the subscriber TN from whom data are being transmitted. The destination address is the address of the subscriber TN to whom the data are being transmitted. A modem MODEM of a subscriber TN can only process data signals in which the destination address coincides with the address of the subscriber TN, i.e. each modem MODEM contains a subscriber-specific address. This ensures that data intended for one subscriber TN cannot be received by another subscriber TN as well.

Figure 6:
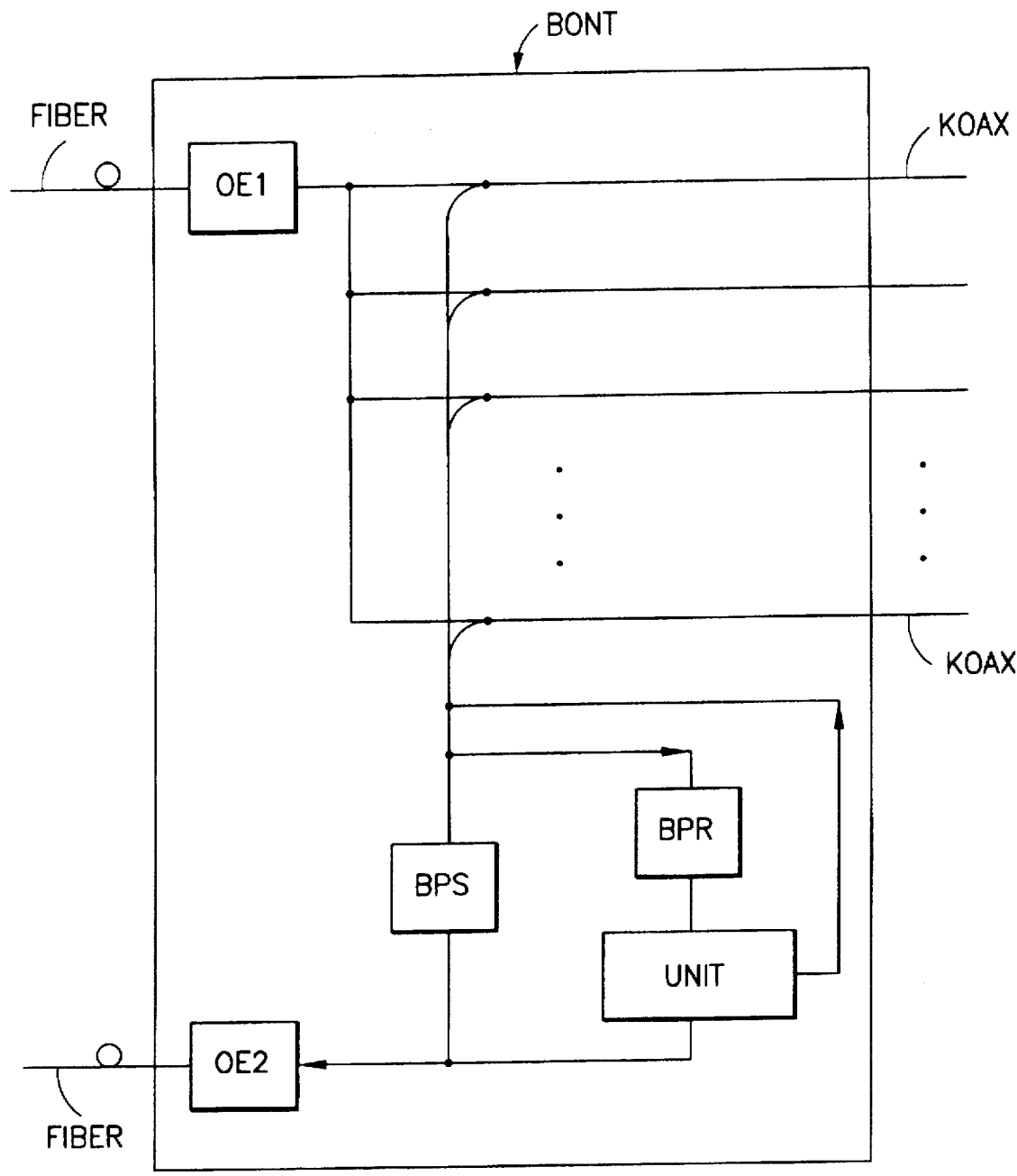
FIG. 6 is a schematically illustrated construction of a broadband network termination of the invention's broadband communication system in FIG. 5.

FIG. 6 illustrates one of the two equivalent broadband network terminations in FIG. 5.

The broadband network termination BONT has two optical-electrical converters OE1, OE2, a control unit UNIT, a band-pass filter for the return channel BPR, and a band-pass filter for the control channel BPS. The band-pass filters BPR, BPS are e.g. passive electrical filters.

The television, radio and video signals transmitted from the center ZE to the broadband network termination BONT are converted by the first optical-electrical converter OE1, and routed to the individual subscribers TN via separate, star-connected coaxial lines KOAX. The signals transmitted to the broadband network termination BONT via the control channel are optically-electrically converted by the second optical-electrical converter OE2, and routed through a star-connection to the separate coaxial lines KOAX via the band-pass filter for the control channel BPS, and thereby to the individual subscribers TN. The band-pass filter for the control channel BPS only lets signals pass, whose frequency is within the frequency range of the control channel.

The signals transmitted from the subscribers TN to the broadband network termination via the return channel are filtered by the band-pass filter for the return channel BPR, and routed to the control unit UNIT. The band-pass filter for the return channel BPR only lets those signals pass, whose frequency is within the frequency range of the return channel. The control unit UNIT monitors for collisions. Since several subscribers TN are connected to a broadband network termination BONT by a common line KOAX, and all subscribers TN have equal access to the common line KOAX, collisions can take place during simultaneous transmission of information by different subscribers TN via the common line. The collisions are detected e.g. by a threshold value detector, which sends out an alarm if the amplitude of the monitored signal exceeds are predetermined threshold value. If a collision takes place, transmission of the collision to the center is blocked and all subscribers TN connected to the respective broadband network termination BONT receive a return message from the control unit UNIT via the downstream channel, about the occurrence of a collision.

The subscribers TN repeat their transmission process after a period of time determined by a random generator. The random generator is located in the modem MODEM. If a collision takes place, the control unit UNIT forwards the signals from the subscribers TN to the center ZE.

In the configuration examples, each broadband communication system SYS has a center ZE. The center ZE can also be subdivided into a main center and several subcenters. In this way, a television and radio server TVS can e.g. be located in the main center, which supplies all subscribers TN with television and radio signals. Local video-on-demand servers VOD and/or service-on-demand servers SOD in several subcenters can then e.g. supply video and data signals to a group of subscribers. This has the advantage that several servers are able to react to regionally different subscriber requests.

In the configuration examples, the collision is detected by the control unit UNIT in the broadband network termination. Instead of being detected by the control unit UNIT, the collision can also be detected by the control facility CONTROL in the center ZE. This has the advantage that standard broadband network terminations can be used.

Furthermore, the set-top converters STU and the modems MODEM in the configuration examples are separate units. The function of the modem MODEM can also be incorporated in a set-top converter STU. In addition to saving the cost of a unit and increasing the user-friendliness, this has the further advantage of saving on circuitry, because of the omission of the duality of components, such as of the voltage supply.

In addition, for reasons of clarity, the configuration examples have no amplifiers, no attenuators, no equalizers, etc. in the centers ZE and broadband network terminations BONT, whose utilization, arrangement, advantages or even necessity are known to the professional, e.g. from "Electrical Information Ways", 3rd. quarter 1993, pages 248 to 259.

In the configuration examples, the number of broadband network terminations BONT and subscribers TN are only examples. In this way, a broadband communication system SYS can contain e.g. 100 broadband network terminations with 150 subscribers each.

In the configuration examples, only the address of one subscriber is indicated as the destination address. The destination address can also address several subscribers, by using a destination address that is valid for a group of subscribers. This would allow contacting a group of subscribers by transmitting a data signal, which could e.g. be advantageous for sending out circulars.

In the configuration examples, the indication of the frequency ranges for the downstream and the return channels, as well as the frequency separation of the two channels, are only examples. In this way, the downstream channel can e.g. cover the 0–862 MHz frequency range with the frequency range of 300 MHz to 310 MHz for the transmission of data signals, and the return channel with the frequency range of 5 MHz to 30 MHz.

What is claimed is:

1. A broadband communication system (SYS) for two-way transmission of information between a center (ZE) and a plurality of subscribers (TN), wherein groups of subscribers (TN) are connected to one broadband network termination (BONT) each, the broadband network terminations (BONT) being connected to the center (ZE), wherein information is transmittable from the center (ZE) to the subscribers (TN) in a broadband downstream channel (V), and from the subscribers (TN) to the center (ZE) in a narrow-band return channel (R), and wherein the information transmitted from one of the subscribers (TN) in the return channel (R) is assignable to the plurality of subscribers (TN) via a channel (PCV) in the downstream channel (V) by means of a control facility (CONTROL) located at the center (ZE), characterized in that each of the broadband network terminations (BONT) comprises a control unit (UNIT), and that each of the control units (UNIT) can detect any simultaneous transmission of information from different subscribers (TN) of a group, and prevent said information from being forwarded to the center (ZE);

wherein the information transmitted from said one subscriber (TN) in the return channel (R) consists of data signals containing a source address, a destination address, and data.

2. A broadband communication system as claimed in claim 1, characterized in that the control facility (CONTROL) comprises means for translating the frequency of the data signals from the frequency band of the return channel (R) to the frequency band of the downstream channel (V).

3. A broadband communication system as claimed in claim 1, characterized in that the destination address is encodable into a subscriber-specific code.

4. A broadband communication system as claimed in claim 1, characterized in that via the destination address, a group of subscribers (TN) is addressable.

5. A broadband communication system as claimed in claim 1, characterized in that at least some of the subscribers (TN) each have a subscriber terminal (PC) and a modem (MODEM), and that via the modem (MODEM), data signals are transmittable over the return channel (R) and receivable over the downstream channel (V).

6. A broadband communication system as claimed in claim 5, characterized in that the subscriber terminal (PC) is a computer.

7. A broadband communication system as claimed in claim 1, characterized in that the information transmitted from the center (ZE) to the subscribers (TN) contains television and video signals.

8. A broadband communication system as claimed in claim 7, characterized in that the center (ZE) comprises a video-on-demand server (VOD), that via a set-top converter (STU), each subscriber (TN) can request video signals over the return channel (R) and receive said video signals over the downstream channel (V), and that the set-top converter (STU) incorporates a modem (MODEM) via which information containing a subscriber-specific source address, a subscriber-specific destination address, and data is transmittable over the return channel (R) and receivable over the downstream channel (V).

9. A method for two-way transmission of information between a center (ZE) and a plurality of subscribers (TN) of a broadband distribution network, the subscribers being divided into groups, wherein information is transmitted from the center (ZE) to the subscribers (TN) in a broadband downstream channel (V), and from the subscribers (TN) to the center (ZE) in a narrow-band return channel (R), and wherein the information transmitted from one of the subscribers (TN) in the return channel (R) is assigned to the plurality of subscribers (TN) via a channel (PCV) in the downstream channel (V) by means of a control facility (CONTROL) located at the center (ZE), characterized in that simultaneous transmission of information from different subscribers (TN) of a group can be detected separately for each group, and that forwarding of said information to the center (ZE) can be prevented;

wherein the information from one of the subscribers (TN) are data signals containing a subscriber-specific source address, a subscriber-specific destination address, and data.

10. A method as claimed in claim 9, characterized in that when several subscribers (TN) of a group transmit simultaneously via a control unit (UNIT), a return message is sent to all the subscribers (TN) of the respective group.

* * * * *

UNITED STATES PATENT AND TRADEMARK OFFICE
CERTIFICATE OF CORRECTION

PATENT NO    : 5,802,449
DATED        : September 1, 1998
INVENTOR(S)  : Dieter Beller, Gert Grammel, Gerhard Elze It is certified that error appears in the above-identified patent and that said Letters Patent is hereby corrected as shown below:

On the title page, item [75], Inventor:
Please delete "Autong" and insert --Autony, France--.

Signed and Sealed this

Sixteenth Day of February, 1999

Attest:

Attesting Officer

Acting Commissioner of Patents and Trademarks